INVENTOR
ORLAND E. ESVAL
BY
HIS ATTORNEY

March 12, 1940. O. E. ESVAL 2,193,531
HIGH SPEED ALTERNATING CURRENT DRIVEN GYROSCOPE
Filed Jan. 23, 1937   2 Sheets-Sheet 2
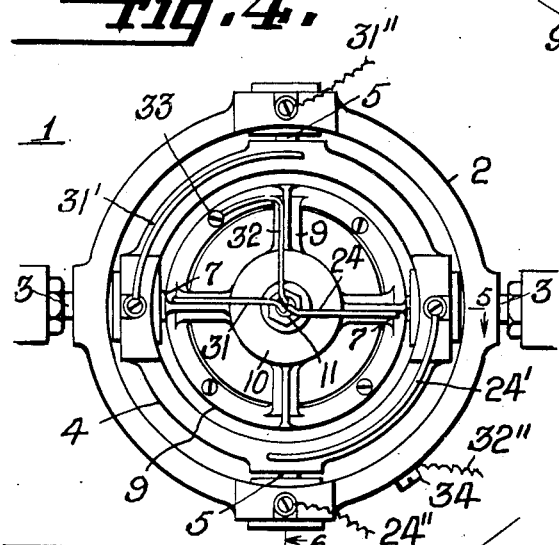
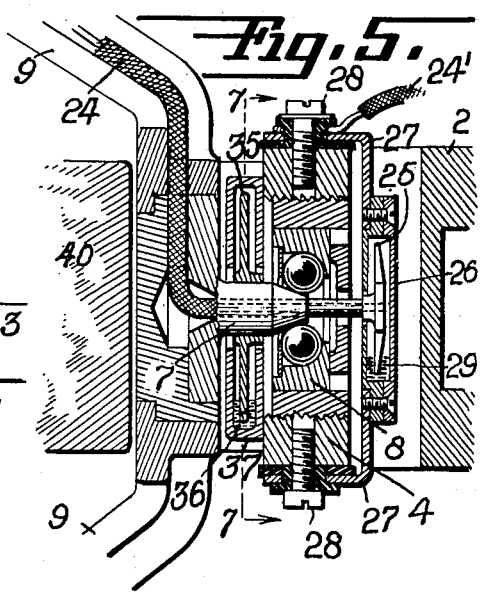
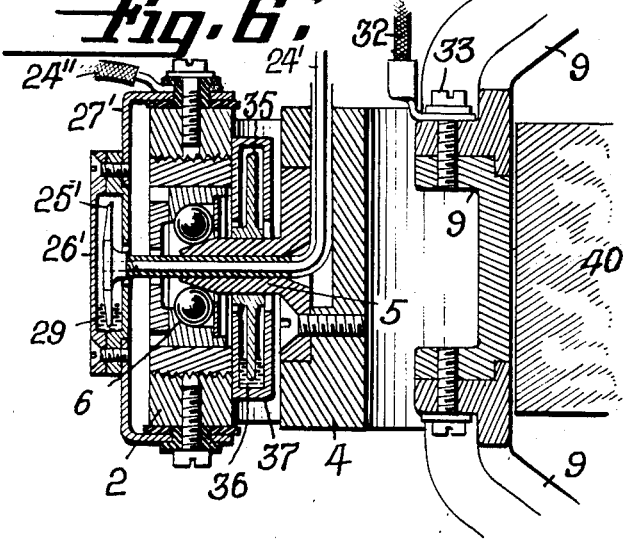
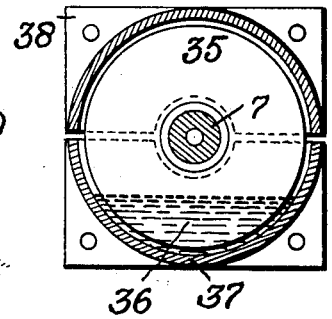
INVENTOR
ORLAND E. ESVAL
BY
Herbert H. Thompson
HIS ATTORNEY Patented Mar. 12, 1940

2,193,531

UNITED STATES PATENT OFFICE 2,193,531

HIGH SPEED ALTERNATING CURRENT DRIVEN GYROSCOPE

Orland E. Esval, Allendale, N. J., assignor to Sperry Gyroscope Company, Inc., Brooklyn, N. Y., a corporation of New York Application January 23, 1937, Serial No. 121,962

4 Claims. (Cl. 74—5)

This invention relates, generally, to gyroscopes, and the invention has reference, more particularly, to a novel construction of high speed A. C. driven gyroscope especially suitable for aircraft instruments and similar uses.

It is highly desirable in the construction of aircraft gyroscopic instruments and auxiliary equipment, such as bomb sights, that the size of the gyroscopes used shall be as small as possible while yet maintaining a rugged design and at the same time obtaining the greatest possible directive force from such gyroscopes. In order to reduce the size of gyroscopes while maintaining a large directive force, it is essential that the speed of the gyro rotor be increased, and such increase in speed involves problems of dynamic balancing and overheating not met with in slower speed gyros.

The principal object of the present invention is to provide a novel high speed A. C. driven gyroscope of small, compact design that is of rugged construction and dependable in use, the said gyroscope having a high directive force and being so constructed and arranged as to have exceedingly small heat losses, whereby the same remains cool indefinitely in use at high speeds of operation.

Another object of the present invention lies in the provision of a novel gyroscope of the above character employing a three phase induction motor type of drive, and wherein the gyro rotor entirely surrounds the stator, thereby preventing stray flux from reaching the outer frame, which would result in eddy current heat losses, the rotor magnetic reluctance being relatively low at slip frequency and hence acting to screen all flux from extending outwardly beyond the rotor.

Still another object of the present invention is to provide a novel gyroscope of the above character wherein the flux densities in the stator, and hence heating effects, are kept to a minimum by using stator laminations without a central shaft hole, the relatively large stator laminations providing a copious path for the stator flux.

A further object of the present invention lies in the provision of a novel gyroscope of the above character, having a novel arrangement for supplying three phase current through the gyroscope gimbal support to the gyro stator, together with a novel rotor bearing lubricating means.

Other objects and advantages will become apparent from the specification, taken in connection with the accompanying drawings wherein one embodiment of the invention is illustrated.

In the drawings,

Fig. 4 is a plan view of the gyroscope, showing the wiring system employed.

Fig. 5 is an enlarged fragmentary sectional view taken along line 5 of Fig. 4, looking in the direction of the arrow.

Fig. 6 is an enlarged fragmentary sectional view taken along line 6 of Fig. 4, looking in the direction of the arrow.

Fig. 7 is a sectional view taken along line 7—7 of Fig. 5.

Similar characters of reference are used in all of the above figures to indicate corresponding parts.

Figure 1:
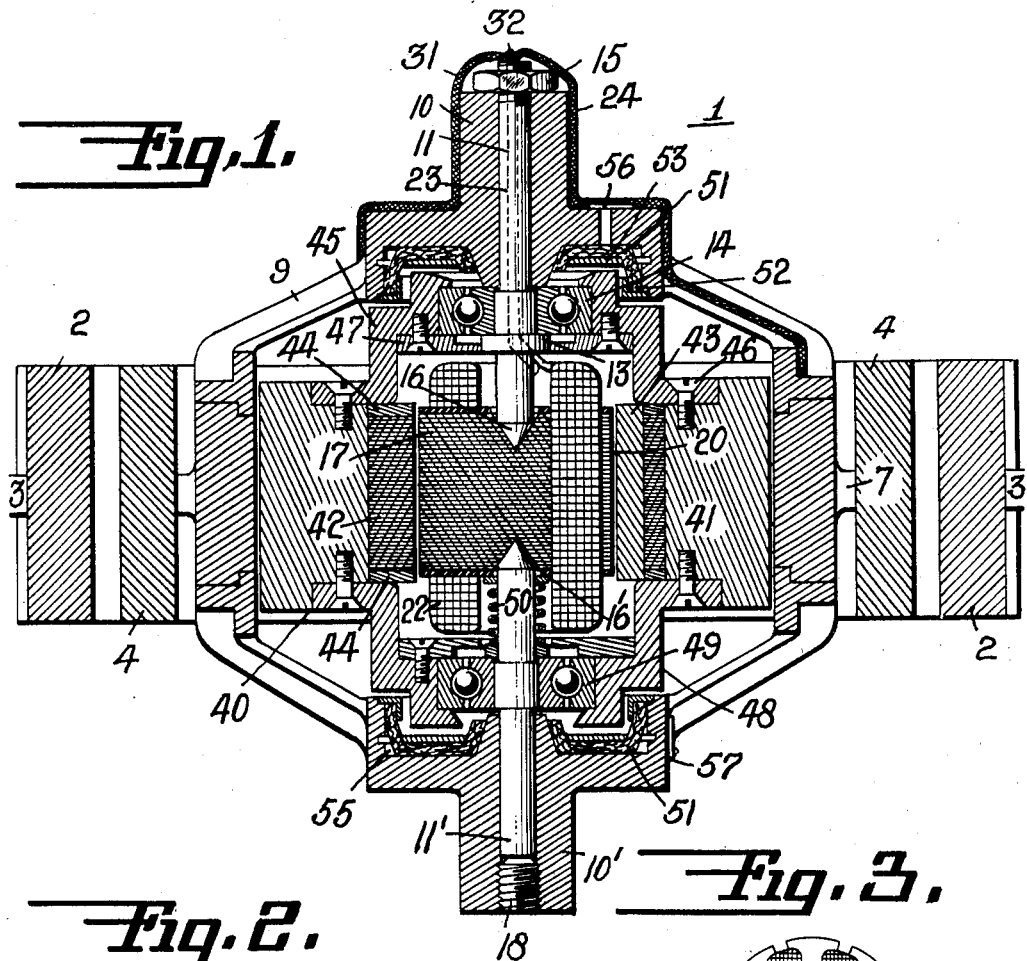
Fig. 1 is a vertical sectional view of the novel gyroscope of this invention.

Referring now to the drawings, the reference numeral 1 designates the novel gyroscope of this invention as a whole, the same having a gimbal mounting consisting of an outer ring 2 antifrictionally journalled at diametrically opposite points on stationary pins 3 carried by the frame of the instrument, and an inner ring 4 having trunnions 5 at right angles to pins 3 and journaled in antifriction bearings 6 (see Figs. 4 and 6) provided in the ring 2, the gyro case or spider frame 9 being provided with trunnions 7 aligned with pins 3 and supported in antifriction bearings 8 (see Fig. 5) provided in ring 4.

The gyro case or spider frame 9 is formed with upper and lower hubs 10, 10' that are axially apertured for receiving aligned stator supporting studs 11, 11'. That portion of stud 11 extending within frame 9 has a flange 13 for supporting the upper rotor antifriction bearing 14, the inner race of this bearing being retained firmly against the lower end of hub 10 by the action of a nut 15 threaded upon stud 11 and abutting the upper end of this hub. The lower end of stud 11 is shown as having the shape of a cone 16 for engaging in a conical depression provided in the upper central portion of stator 17. Similarly, the upper end of stud 11' is of conical shape, as indicated at 16', for engaging in a conical depression provided in the lower central portion of stator 17, whereby this stator is supported centrally within the frame 9 by the inner end portions of studs 11 and 11'. A plug 18 is threaded upwardly into the axial aperture of lower hub 10' and abuts stud 11' for pressing this stud upwardly and firmly against the stator 17 to thereby fixedly secure this stator between studs 11 and 11'.

Figure 3:
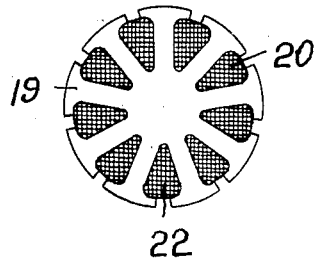
Fig. 3 is a sectional view of the gyro stator.

Stator 17 comprises a core consisting of a pile of punchings 19 (see Fig. 3) of soft iron or other suitable magnetic conducting material, that are secured together into an unitary whole by a suitable binder, such as a phenolic condensation product or other synthetic or natural resin such as shellac. Preferably, the punchings are coated with the dry, powdered binder and then consolidated into an unitary whole by use of heat and pressure.

The number of winding slots 20 in the stator is preferably kept low so that the flux densities in the stator are kept to a minimum, and since no shaft extends through the center of the stator and as no rivets are used to hold the punchings 19 together, there is no unlaminated high hysteresis material in the path of the high frequency flux with the exception of the relatively small conical ends of studs 11 and 11', so that a minimum heating of the stator takes place in use, making possible the high speed operation of the gyroscope. As thusly constructed, as will be apparent from an inspection of Fig. 3, the stator laminations provide uninterrupted low reluctance flux conducting paths extending substantially directly across the stator from side to side thereof.

A three phase winding 22 is wound on the core of stator 17 and the three insulated supply leads therefor extend outwardly through a passage 23 provided in stud 11. From the top of stud 11, one of these leads 24 extends down the spider frame 9 and out through a central aperture provided in one frame trunnion 7 (see Fig. 5) and has an electrical contact disc 25 attached to the end thereof. The portion of the insulation of lead 24 within trunnion 7 and extending between this trunnion and disc 25 is of rigid character, such as a fiber or Bakelite tube. Disc 25 is contained within a hollow cylindrical member 26 and dips into a small pool of mercury 29 within said member. Member 26 is attached by straps 27 and screws 28 to the inner gimbal ring 4. Insulating washers surrounding screws 28 serve to insulate member 26 from ring 4. An insulated lead 24' extends from one of the straps 27 ninety degrees along ring 4 and out through a central aperture provided in one inner ring trunnion 5 (see Fig. 6) and has a contact disc 25', similar to contact disc 25, attached to the end thereof. Disc 25' is also contained in a cylindrical member 26' containing mercury 29, which member is supported by straps 27' upon outer gimbal ring 2, though insulated from this ring. A lead 24" is electrically connected to one of the straps 27' and to one phase of a three phase supply, whereby, in use, current from such supply passes through lead 24", strap 27', member 26', mercury 29, disc 25', lead 24', strap 27, member 26, mercury 29, disc 25, lead 24 to one phase of the stator winding 22.

Another of the phase leads 31 of the stator winding 22 extends out the top of stud 11 and passes down the spider frame 9 and out through trunnion support 7 thereof opposite that through which lead 24 extends. This lead is similarly electrically connected through a contact disc and mercury to a lead 31' (see Fig. 4) that extends ninety degrees around inner ring 4 and is similarly connected to a lead 31" connected to the second phase of the three phase supply.

The third of the stator phase leads 32 extends from stud 11 to a screw 33 grounded on the spider frame 9 and is supplied with current from the third three phase current supply lead 32" that is grounded on outer ring 2 at screw 34. In order that current flowing through the gimbal support between screw 34 and screw 33 shall not injure the antifriction bearings of the gimbal mounting, the same is provided with means for by-passing current around these antifriction bearings. This is accomplished by providing contact discs 35 on one of the pivoted trunnions 5 of the inner ring 4 and on one of the pivoted trunnions 7 of the spider frame 9. These contact discs are fixed on the trunnions and dip into mercury pools 36 provided in hollow casings 37. As shown in Figs. 5, 6 and 7, the casings 37 are made up in two halves, an upper and lower half, to facilitate the assembling of the same in enclosing relation to the contact discs 35. These halves of the casings are of semi-cylindrical shape and provided with apertured flanges 38 for receiving screws with which they are attached to the gimbal rings. Thus, the current from lead 32" flows through outer ring 2, casing 37, mercury pool 36, contact disc 35 mounted on trunnion 5, inner ring 4, casing 37, pool 36, contact disc 35 mounted on trunnion 7, and thence through the spider frame to post 33.

The gyro rotor 40 entirely surrounds the stator 17 and consists of an annular rotor body or ring member 41, preferably of steel or other suitable strong material. Within the rotor body 41 is a pile of annular, soft iron or other suitable laminations or punchings 42 constituting the core of the rotor. These laminations 42 are provided with inclined or vertical slots for receiving inductor bars 43, which are short circuited at their ends by annular end plates 44 to which bars 43 are secured. The rotor core 42 is horizontally aligned with the stator 17 and concentric therewith. The rotor is supported upon the antifriction bearing 14 by means of an annular bracket member 45, preferably of steel, that is secured, as by screws 46, to the rotor 41 and is carried by the outer race of bearing 14, an annular plate 47 being employed to retain the anti-friction bearing in assembled relation with the bracket 45.

A second annular bracket member 48 is provided on the lower portion of the rotor and carries an antifriction bearing 49 that is mounted on the lower stud 11'. A spring 50, surrounding the upper portion of stud 11', has its thrust exerted upon the inner race of bearing 49 for preventing play of this race on the stud. Bracket members 45 and 48 serve to retain laminations 42 and end plates 44 in fixed assembled relation with the rotor body 41.

In order to obtain a continuous lubrication of the bearings 14 and 19, wicks 51 are provided. The upper portion of the spider frame is provided with an annular oil retaining chamber 52, into which wicks 51 dip and extend upwardly and inwardly over a baffle plate 53 carried by the spider frame. The free ends of the wicks terminate just above the bearing 14 for supplying lubricant thereto. The upper portion of annular bracket member 45 is so shaped that any lubricant thrown out from bearing 14 due to centrifugal action is thrown against the spider frame at points above the chamber 52 and hence is conveyed back by gravity into this annular chamber 52. The lower annular bracket member 48 also has its lower portion so shaped as to direct any oil escaping from bearing 49 by centrifugal action upon the wicks 51, for such oil will again drain down into the annular oil pocket 55 to be fed by the capillary action of wicks 51 up to the bearing 49 for re-use. Suitable oil ducts and covers 56 and 57 are provided for admitting oil to the wicks 51 for replenishing used up oil.

The novel lubricating system heretofore described serves to continuously and adequately supply the antifriction bearings with lubricant at all times regardless of the speed of operation of the gyro rotor.

Figure 2:
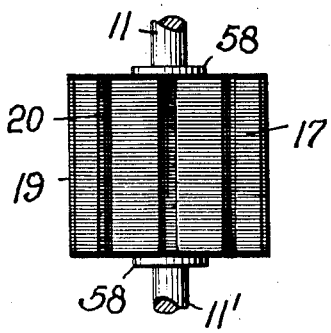
Fig. 2 is a view in elevation of a slightly modified form of gyro stator, with the windings removed.

If desired, the studs 11 and 11', instead of being provided with conical points for projecting somewhat into the end portions of the stator 17, may be provided with end flanges 58, as especially shown in Fig. 2, which end flanges are preferably secured to the stack of punchings 19 at the time of molding the same by the molding fluid, thereby eliminating any projecting part of the studs 11, 11' within the laminations 19.

In use, current supplied from the three phase supply leads 24", 31" and 32" serves to energize the stator winding 22 to thereby produce a rotating field which, acting upon the rotor bars 43, serves to produce currents therein which effect rapid rotation of this rotor on the antifriction bearings 14 and 49. Inasmuch as the gyro rotor surrounds the stator, the same is adapted to have relatively considerable mass even though the instrument as a whole is very small, and hence the gyroscope has high directive power. This is greatly enhanced by the high speed of operation possible by the novel gyroscope of this invention. For example, high frequency currents of as much as 500 cycles or over are suitable for operating the novel gyroscope of this invention, resulting in speeds of 30,000 R. P. M. and higher. This high speed in ordinary gyros would result in overheating, but such does not take place when operating the novel gyroscope of this invention because of the extremely low hysteresis and eddy current losses resulting from the novel construction of this invention. It will be noted that since the rotor entirely surrounds the stator, the same serves to prevent stray flux from getting into the outer spider frame 9, which would otherwise cause additional eddy current losses. At ordinary slip frequency, the magnetic reluctance of the rotor is extremely low and acts as an effective screen for preventing any flux from reaching the frame 9 and hence eliminates heating thereof.

Also, another very important feature in preventing heating of the gyro is the use of a direct and unimpeded path for all flux through highly conductive magnetic material, all high hysteresis unlaminated material, such as ordinarily present in the form of a central shaft and rivets, having been eliminated in the stator and rotor of the gyroscope of this invention.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a high speed A. C. driven gyroscope, an annular rotor, a stator within said rotor comprising a plurality of punchings of low reluctance low hysteresis metal secured together solely by a binder, thereby providing flux paths therethrough that are uninterrupted by high hysteresis unlaminated material said stator being positioned and held with respect to said rotor by a pair of axial cone-ended studs.

2. In a high speed gyroscope, a gyroscope case, a gimbal support for said case, oppositely aligned cone-ended studs carried by said case and extending thereinto, a stator having axially positioned conical depressions for engaging the cone ends of said studs and confined between the inner portions of said studs, and a rotor surrounding said stator and antifrictionally mounted on said studs, concentrically with said stator.

3. In a high speed A. C. motor, an annular rotor, a stator within said rotor, and a pair of cone-ended studs engaging axially positioned conical depressions in the two ends of said stator for supporting the same.

4. In a high speed A. C. driven gyroscope having a frame and an annular rotor rotatable therein, a stator within said rotor comprising a plurality of laminations of low reluctance low hysteresis metal secured together solely by a binder, a substantial majority of said laminations having no reduction of area other than coil slots and a pair of cone-ended pivots entering into and engaging depressions in the ends of said stator along the axis thereof for aligning and supporting the same.

ORLAND E. ESVAL.